Sept. 17, 1963  B. P. BLASINGAME  3,103,819
GRAVIMETER
Filed Oct. 8, 1959  2 Sheets-Sheet 1

INVENTOR.
Benjamin P. Blasingame

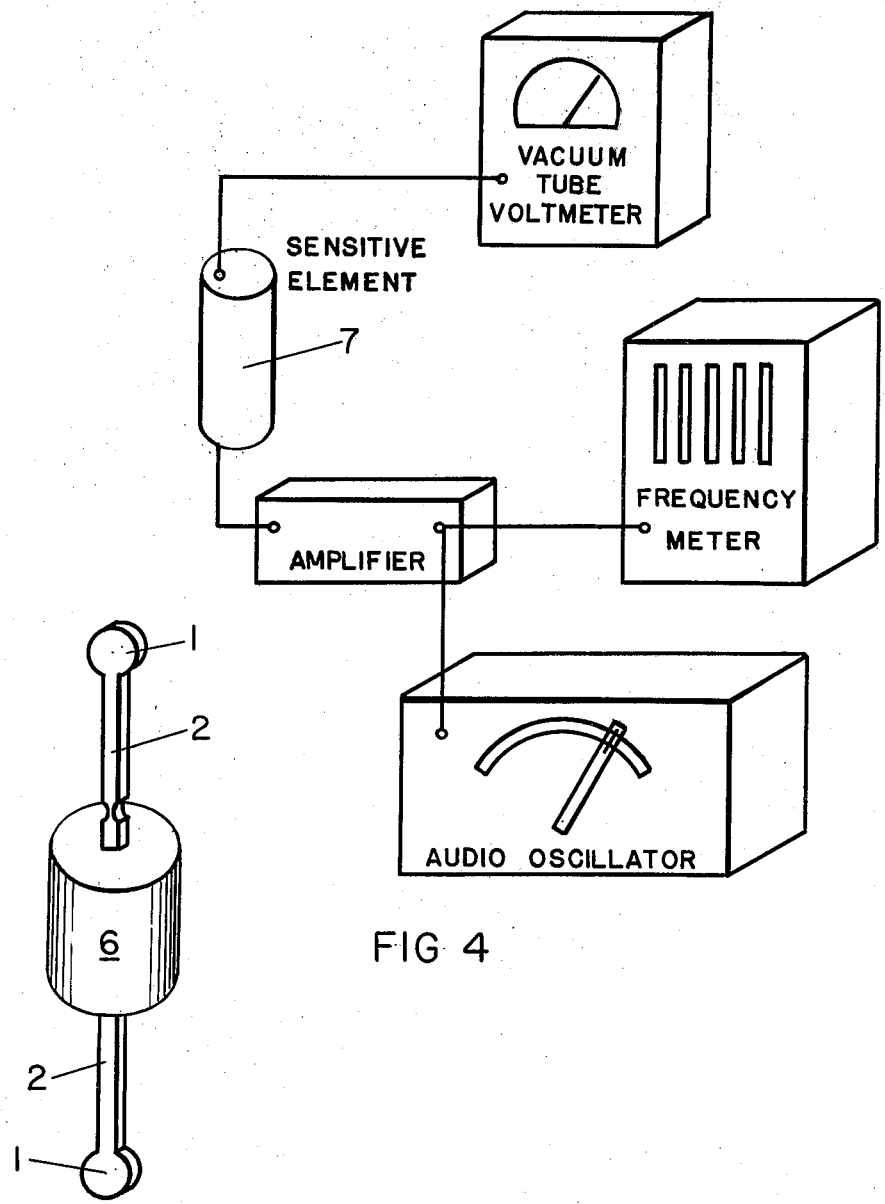

3,103,819
GRAVIMETER
Benjamin P. Blasingame, Air Force Academy, Colo.
(2621 E. Menlo Blvd., Milwaukee 11, Wis.)
Filed Oct. 8, 1959, Ser. No. 845,137
11 Claims. (Cl. 73—382)

The use of gravity measurements in geophysical exploration is well known. In the exploration for new oil resources, a map of the lines of constant gravity plotted at intervals of $10^{-6}g$ or $10^{-7}g$ has frequently been used to locate anomalies in the earth where oil collects. To make such maps, instruments called gravimeters which can detect changes of a little as $10^{-8}g$ are used to measure the strength of gravity at many points over a large field. The map is constructed from these measurements.

Present instruments for this purpose are mostly spring scale and test mass devices arranged to have extraordinary sensitivity—i.e. a large change in reading for a small change in gravity. One such instrument is an inverted pendulus reed sealed in a vacuum. When held with the reed vertical—the mass at the top and the fixed end at the bottom, gravity ends to deflect the reed further away from the vertical position once the reed in deflected. Thus the reed will oscillate at a lower frequency when held in the "inverted pendulum" position than when held with the weighted end down like a normal pendulum. If the period of this pendulum is made very long, it is found that its period changes quite markedly with small changes in gravity. Thus, measuring the period of this pendulum provides a measure of the local value of gravity.

If the period of this inverted pendulum could be made infinite for some particular value of gravity, the pendulum would no longer oscillate but the pendulum mass would remain in any set position. If now gravity be increased ever so slightly, the reed will simply bend over until it hits mechanical stops. When adjusted to this condition, the device may be said to have near infinite sensitivity because a slight change in the input gravity causes the output to increase indefinitely.

To be useful, such a pendulum of adjustable period must be capable of adjustment to this condition for all values of gravity and the means of adjustment must be calibrated and extremely accurate since the measurement of gravity is made in terms of this adjustment. The whole assembly must be free of changes introduced by temperature, humidity, etc.

The subject invention is, in essence, such an inverted pendulum of accurately adjustable period which is self calibrated so as to eliminate environmental effects.

The means by which this is accomplished in the subject invention will be apparent from the following description when read in connection with the following figures wherein:

FIGURE 4 is a schematic of the entire system needed to operate subject invention.

FIGURE 5 is a sketch of a double ended sensitive element.

Figure 1:
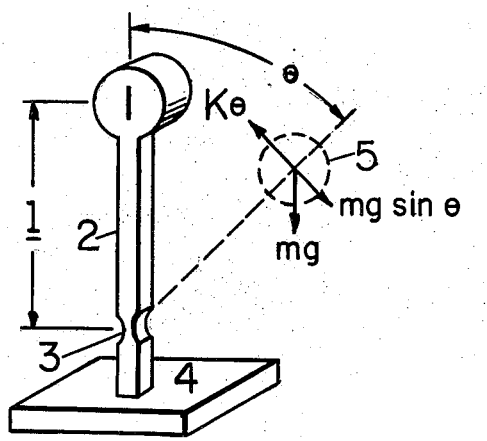
FIGURE 1 is a sketch of a simple inverted pendulum.

In FIGURE 1 a simple inverted pendulum consisting of a mass 1 on the end of a reed like member 2 made of high grade spring metal which has been machined down to a thin cross section at 3 a distance $l$ from the center of mass of the aforementioned mass is fastened to a substantial base 4. The reduced section 3 permits the pendulum to deflect to some position as at 5 where the assembly has been deflected through the angle $\theta$ as shown. In this position, the spring exerts a restoring force proportional to the angle of deflection $\theta$. As seen in the associated force diagram this spring force together with the gravitational force result in a total restoring force of $$K\theta - mg \sin \theta$$

where:

$K$ is the spring constant
$m$ is the mass
$g$ is the specific force of gravity.

The moment of inertia of the pendulum is very nearly $ml^2$ since the mass of the reed is comparatively small. Assuming no damping as would result from air drag and hysteresis in the spring section, the following differential equation describes the sum of the inertia and spring forces as being equal to zero by D'Alembert's principle.

$$ml^2 \frac{d^2\theta}{dt^2} + lK\theta - lmg \sin \theta = 0 \tag{1}$$

For the small angle to which $\theta$ is restricted by design, $\sin \theta \approx \theta$, therefore $$ml\ddot{\theta} + K\theta - mg\theta = 0$$

This second order differential equation is typical of oscillatory systems for which the undamped frequency of oscillation, $\omega$ is given by:

$$\omega_1^2 = \frac{K - mg}{ml} = \frac{K}{ml} - \frac{g}{l}$$

$$\omega_1^2 = \omega_n^2 - \frac{g}{l} \tag{2}$$

By direct analogy, if the pendulum were turned over into the more normal pendulus position, the system will oscillate at a frequency given by:

$$\omega_2^2 = \omega_n^2 + \frac{g}{l} \tag{3}$$

Imagine now that two such readings had been obtained. Subtracting the squares of the two frequencies gives:

$$\omega_2^2 - \omega_1^2 = 2\frac{g}{l}$$

$$g = \tfrac{1}{2}l(\omega_2^2 - \omega_1^2) \tag{4}$$

By this technique, the spring characteristics of the system are eliminated thus eliminating any temperature or other environmental effects associated with the spring. The length term, $l$, remains in the equation and so must be made independent of temperature by proper choice of material and design. Equation 4 shows how the value of gravity is measured by this device. The two frequencies, $\omega_1$ and $\omega_2$ are measured and then by application of Equation 4, the value of gravity is computed. The important question is, how sensitive is such a system? What is the smallest change in gravity which can be detected? The derivative of the frequency difference with respect to gravity expresses this sensitivity.

$\omega_2$, the frequency measured with the mass down will change very little under any circumstance because it is related to the sum of two terms. $\omega_1$ on the other hand is related to the difference of two terms so that a change in gravity can make a large change in this frequency.

Hence, the sensitivity, $d\omega_1/dg$ is the only one of importance and is computed as follows:

$$\omega_1^2 = \omega_n^2 - g/l$$

$$2\omega_1 \frac{d\omega_1}{dg} = -\frac{1}{l}$$

$$\frac{d\omega_1}{dg} = -\frac{1}{2l\omega_1} = -\frac{1}{2l\sqrt{\omega_n^2 - g/l}} \quad (5)$$

Notice that as the square of the undamped natural frequency of the reed approaches the value $g/l$ that the sensitivity approaches infinity. The undamped natural frequency is $k/ml$ therefore:

$$\frac{d\omega_1}{dg} = \frac{1}{2\sqrt{l}\sqrt{K/m - g}}$$

The condition for high sensitivity is this:

$$K/m = g$$

This states simply that the force per unit of mass of the spring should equal the force per unit mass of gravity.

Figure 2:
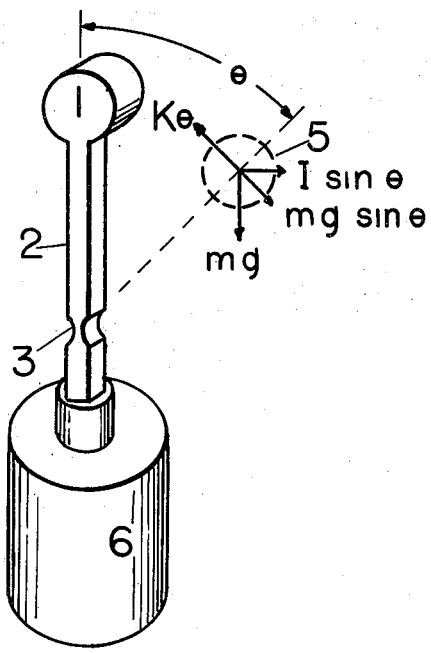
FIGURE 2 is a sketch of an inverted pendulum which has been arranged to be rotated about a vertical axis at a precisely known speed.

Turning now to FIGURE 2, the same inverted pendulum of FIGURE 1 has been mounted on the shaft of a motor whose speed may be adjusted to any desired value. There is now an additional force exerted on the mass of the pendulum whenever it is deflected—a centrifugal force. Notice that this force is proportional to the distance of the mass from the vertical centerline. Notice also that by adjusting the speed of this motor that the spring constant of the system is effectively made adjustable. With the excellent frequency measuring equipment available today, this speed can readily be measured to great precision.

The crux of this invention is contained in the preceding paragraph—the principle by which a pendulum may be given any natural period by adjustment of an external source, the frequency of the voltage supplied to the motor and this adjustment can be made to extreme precision. There are several ways in which this instrument system may be used; the preferred technique is now described.

The rotatable pendulum assembly is called the sensitive element in the following. The sensitive element is carefully leveled in the inverted pendulum direction to get the spin axis vertical. The speed is now adjusted until the pendulum will not oscillate and starts to come to rest in a deflected position. The speed to cause this is recorded as $\Omega_1$. The sensitive element is now "plunged" as one plunges a transit—the element is turned completely over, the pendulum mass now being down. The speed is again adjusted until the mass takes up a rest position away from the vertical spin axis. The speed to cause this condition is recorded as $\Omega_2$. The local value of gravity is then computed from these two readings by the formulas derived in the following.

From the force diagram of FIGURE 2, the torques (neglecting any damping), caused by inertia reaction, gravity, the spring and rotation must add up to zero by d'Alembert's principle thus:

$$ml^2 \frac{d^2\theta}{dt^2} + Kl\theta - ml^2 \sin\theta \Omega_1^2 - mgl \sin\theta = 0 \quad (6)$$

Again $\sin\theta \approx \theta$ $$ml\ddot{\theta} + (K - ml\Omega_1^2 - mg)\theta = 0$$

From which the frequency of oscillation is seen to be:

$$\omega_1^2 = \frac{K - ml\Omega_1^2 - mg}{ml}$$

$$= \frac{K}{ml} - \Omega_1^2 - \frac{g}{l}$$

$$= \omega_n^2 - \Omega_1^2 - \frac{g}{l} \quad (7)$$

The sensitivity, $d\omega_1/dg$ is:

$$2\omega_1 \frac{d\omega_1}{dg} = -\frac{1}{l}$$

$$\frac{d\omega_1}{dg} = -\frac{1}{2l\omega_1} = \frac{-1}{2l\sqrt{\omega_n^2 - \Omega_1^2 = g/l}} \quad (8)$$

Here it is seen that adjustment of $\Omega_1$ permits adjusting the sensitive element to have near or actual infinite sensitivity.

By analogy, when the sensitive element is plunged mass down:

$$\omega_2^2 = \frac{K - ml\Omega_2^2 + mg}{ml} \quad (9)$$

$$= \omega_n^2 - \Omega_2^2 + g/l$$

$$\frac{d\omega_2}{dg} = \frac{+1}{2l\sqrt{\omega_n^2 - \Omega_2^2 + g/l}} \quad (10)$$

It is now clear that this latter sensitivity can also be made near infinite. Thus the difference of the squares of the frequencies which will now be read as $\Omega_2^2 - \Omega_1^2$ can be made very large indeed. Having adjusted $\Omega_1$ and $\Omega_2$ to make $\omega_1$ and $\omega_2$ exactly zero, the value of gravity is computed as follows:

$$\omega_1^2 = 0 = \omega_n^2 - \Omega_1^2 - \frac{g}{l} \quad (11)$$

$$\omega_2^2 = 0 = \omega_n^2 - \Omega_2^2 + \frac{g}{l} \quad (12)$$

Subtracting:

$$0 = \Omega_2^2 - \Omega_1^2 - 2\frac{g}{l}$$

$$g = \tfrac{1}{2}l(\Omega_2^2 - \Omega_1^2) \quad (13)$$

The parameter $l$ must be kept constant by proper choice of materials and design. This parameter is evaluated by operating the system at a point where gravity is known very accurately.

It should now be observed that the reed can be made quite stiff so that when not being rotated, it may be handled easily without regard for delicacy.

Figure 3:
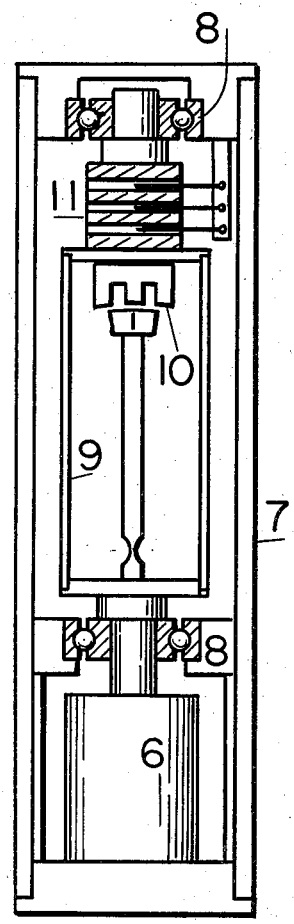
FIGURE 3 is a sketch of a more complete design of the sensitive element of this invention.

In FIGURE 3 a more complete design of the sensitive element is presented. In an actual design means must be included to detect the pendulum position externally by remote control. In fact it is desired that the instrument be designed for remote operation since it will be desirable to make measurements under water and in deep wells.

In this design, the entire sensitive element is built into a tubular hermetically sealed case 7 inside of which two diaphragms carry ball bearings 8 in which is mounted an inner case 9 into which is built the pendulum or reed assembly. An electro-magnetic pick-off is mounted 10 above the pendulum mass 1 which is the armature of the pick-off causing an output alternating voltage whose magnitude is proportional to the pendulum displacement and whose phase angle indicates the sense of the displacement, right or left. The connections to this pick-off which must rotate with the pendulum, are made through the slip ring assembly 11. The motor 6 is a synchronous type such as an hysteresis type whose speed is precisely determined by the frequency of the supply voltage.

FIGURE 4 shows all the elements of a system to operate the sensitive element. An audio oscillator supplies an alternating voltage of adjustable frequency. After suitable power amplification, this alternating voltage is used to drive the synchronous motor in the sensitive element. The pick-off is excited from a reference alternating voltage and its output and hence pendulum deflection may be read by a standard vacuum tube voltmeter. In this way, the pendulum is adjusted as described earlier. To read the rotational speed, it is only necessary to measure the frequency of the audio signal generator once the adjustment is made. A standard laboratory type pulse counting frequency meter may be used for this purpose.

FIGURE 5 shows a double ended version of the sensitive element which has certain utility. This may be used to give two different measurements at a time thus increasing the reliability of measurement. This design may also be used when it is difficult or inconvenient to make the two measurements one with the pendulum inverted and one with the pendulum normal. To illustrate—consider that before using, the device is calibrated by taking readings with both pendulums in the two positions. By Equations 11 and 12:

$$\omega_1{}^2 = 0 = \omega_{n_1}{}^2 - \Omega_1{}^2 - g/l_1$$
$$\omega_2{}^2 = 0 = \omega_{n_1}{}^2 - \Omega_2{}^2 + g/l_1$$

Adding:

$$\Omega_1{}^2 + \Omega_2{}^2 = 2\omega_{n_1}{}^2$$

Then:

$$\omega_3{}^2 = 0 = \omega_{n_2}{}^2 - \Omega_3{}^2 - g/l_2$$
$$\omega_4{}^2 = 0 = \omega_{n_2}{}^2 - \Omega_4{}^2 + g/l_2$$
$$\Omega_3{}^2 + \Omega_4{}^2 = 2\omega_{n_2}{}^2$$
$$\omega_{n_2}{}^2 - \omega_{n_1}{}^2 = \tfrac{1}{2}(\Omega_3{}^2 + \Omega_4{}^2 - \Omega_1{}^2 - \Omega_2{}^2)$$

Consider now that a measurement is made when the device cannot be inverted. The following pair of measurements would be made:

$$\Omega_5{}^2 = \omega_{n_1}{}^2 - g/l_1$$
$$\Omega_6{}^2 = \omega_{n_2}{}^2 + g/l^2$$
$$\Omega_6{}^2 - \Omega_5{}^2 = \omega_{n_2}{}^2 - \omega_{n_1}{}^2 + g(1/l_1 + 1/l_2)$$

Then:

$$g(1/l_1 + 1/l_2) = \Omega_6{}^2 - \Omega_5{}^2 - \tfrac{1}{2}(\Omega_3{}^2 + \Omega_4{}^2 - \Omega_1{}^2 - \Omega_2{}^2)$$

Thus the natural frequency which might be subject to temperature effects can be removed by a preliminary self-calibration of the system in the field. The difference between the squares of the two natural frequencies, $$\omega_{n_2}{}^2 - \omega_{n_1}{}^2$$

should be little affected by temperature since each pendulum should be affected in the same way.

Thus it is seen that this invention provides a new and useful means to measure the specific force of gravity to extreme precision and to arbitrarily large sensitivity. The actual reduction to practise of this invention may differ in great detail without departing from the spirit of the invention.

What I claim is:

1. A gravimeter consisting of a reed having mass, a synchronous motor having a shaft attached to one end of the reed, the longitudinal axis of said reed being free to deflect away from the rotational axis of said shaft, the center of mass of said reed being located along the axis of rotation of said motor when said motor is in operation and the reed undeflected, said axis of rotation being vertical, a pick-off to provide an indication of the deflection of the reed away from said axis of rotation, together with means such as a precisely calibrated variable frequency alternating current supply for accurately adjusting and indicating the speed of said synchronous motor.

2. A gravimeter consisting of a rod having mass, a synchronous motor having a shaft, a narrow section in said rod dividing it into a major and a minor part so that the major part may be deflected angularly away from the longitudinal axis of the minor part, the minor part being affixed as an extension of said shaft, such that the center of mass of the major part of the rod when not deflected is essentially on the axis of rotation of said motor, said axis of rotation being vertical, a source of alternating current whose frequency may be set accurately or monitored by a frequency meter connected to said synchronous motor thereby providing means to set the rotational speed of the rod, and means for indicating the deflection of the major part of the rod from its rest position.

3. A gravimeter consisting of a rod having mass, a synchronous motor having a shaft, said rod affixed as the co-axial extension of said shaft, a narrow section in said rod creating a portion of said rod whose axis may be deflected angularly from the axis of rotation of said shaft, said axis of rotation being vertical, a source of alternating current whose frequency may be set accurately or monitored and indicated by a frequency meter, said source being connected to said synchronous motor thereby providing means to rotate the rod at an accurately known speed, and means for indicating the deflection of the rod from its rest position.

4. A gravimeter consisting of a synchronous motor having a shaft, a rod having mass affixed to said shaft with its longitudinal axis co-axial with the axis of rotation and affixed as an extension of said shaft, a narrow section in said rod thus isolating a portion of said rod from said shaft so that the longitudinal axis of said isolated portion may be deflected angularly from the axis of rotation of said shaft, said axis of rotation being vertical, a source of alternating current whose frequency may be set accurately or monitored and indicated by a frequency meter, said source of alternating current being connected to said synchronous motor, so that the rod may be rotated about its undeflected axis, and means for indicating the angular deflection of the isolated portion of the rod.

5. A gravimeter consisting of an elastic pendulum constructed of a mass mounted to a stiff rod having a narrow section thus forming a spring restrained pivot so that said pendulum may be operated in the inverted position, i.e., the mass above the pivot or in the normal position, i.e., the mass below the pivot, the period of said pendulum being dependent upon the acceleration of gravity, its physical dimensions and movement of inertia and the spring constant of the pivot, means including a synchronous motor for rotating said pendulum about a vertical axis, the longitudinal axis of the aforementioned stiff rod and the center of mass being on the axis of rotation when the pendulum is in its undeflected position, means to measure the deflection of the pendulum, means such as an adjustable frequency alternating current source connected to the synchronous motor so that the rotational speed may be adjusted and means such as a frequency meter to indicate the speed of rotation.

6. An acceleration measuring device consisting of a synchronous motor having a shaft, a pendulous reed affixed at one end to said shaft and mounting a mass on the opposite end such that the center of mass is along the axis of rotation of said shaft when the reed is undeflected, said axis of rotation being vertical, means such as an adjustable frequency alternating current source together with a frequency meter, to supply current to operate said synchronous motor and means to indicate the deflection of the reed away from its neutral position.

7. An acceleration measuring device consisting of a synchronous motor having a shaft, a reed mounting a mass at one end and affixed as the extension of said shaft at the other end, said mass being on the axis of rotation of said shaft when the reed is undeflected, said axis of rotation being vertical, means such as a frequency meter and an adjustable frequency alternating current source supplying current to said synchronous motor to control accurately the speed of rotation of said motor and means to indicate the displacement of said reed with respect to said axis of rotation.

8. A gravimeter consisting of a synchronous motor having a shaft, said shaft protruding from each end of said motor, two reeds, each reed mounting a mass at one end and affixed at the other to one end of said shaft such that the center of mass of said reeds and mass assemblies are along the center of rotation of said shaft when the reeds are undeflected, said axis of rotation being vertical, means such as a frequency meter and adjustable frequency alternating current source connected to the synchronous motor so that the speed of rotation can be set accurately and means for indicating the deflection of each reed away from the vertical axis.

9. A gravimeter comprising two reeds each consisting of a rod with a mass mounted at one end, a synchronous motor having a shaft, said shaft protruding from each end of said motor, an elastic section in said rod, and mounted at the end opposite the mass as an extension to either end of said shaft so that the center of mass of each reed is located as near as possible along the rotational axis of said shaft when said reeds are undeflected, said rotational axis being vertical, means including a frequency meter and an adjustable frequency alternating current source connected to said synchronous motor so that the motor's speed may be set precisely and means such as an electrical or electro-magnetic pick-off to indicate the deflection of each reed away from its undeflected position.

10. In a gravimeter a synchronous motor having a shaft, an elastic pendulum consisting of a rod like member having mass attached to and made integral with one end of an elastic section, the opposite end of said elastic section being attached to or made integral with said shaft so that the center of mass of the pendulum is essentially on the axis of rotation of said shaft when the elastic pendulum is undeflected, said axis of rotation being vertical, a pick-off to provide an indication of the deflection of the elastic pendulum away from the axis of rotation together with means such as a frequency meter and a variable frequency alternating current supply for accurately adjusting and indicating the speed of said synchronous motor.

11. A gravimeter comprising a synchronous motor having a shaft, said shaft protruding from each end of said motor, two elastic pendulums each consisting of a member having mass attached to or made integral with one end of an elastic section, the other end of the elastic section being attached to or made integral with one end of said shaft, said shaft having two ends with the nearly identical pendulums affixed one to each end of the shaft, both pendulums being mounted so that their centers of mass are essentially along the axis of rotation of said shaft, said axis of rotation being vertical, means to indicate the deflection of the elastic pendulum away from the axis of rotation together with means such as a frequency meter and a variable frequency alternating current supply for accurately establishing the speed of said synchronous motor.

References Cited in the file of this patent

UNITED STATES PATENTS

| | | |
|---|---|---|
| 2,319,940 | Marrison | May 25, 1943 |
| 2,732,717 | Rothacker | Jan. 31, 1956 |